Oct. 31, 1950 — R. C. CERRUTI — 2,528,114
CONVEYING SYSTEM
Filed July 6, 1946 — 2 Sheets-Sheet 1

Inventor
Richard C. Cerruti
By Lyon & Lyon
Attorneys

Inventor
Richard C. Cerruti
By Lyon & Lyon
Attorneys

Patented Oct. 31, 1950

2,528,114

UNITED STATES PATENT OFFICE 2,528,114

CONVEYING SYSTEM

Richard C. Cerruti, Oakland, Calif., assignor to California Packing Corporation, San Francisco, Calif., a corporation of New York Application July 6, 1946, Serial No. 681,671

4 Claims. (Cl. 198—34)

The present invention relates to conveying systems.

It is desirable, in food packing plants and the like, to transport products, packaged or otherwise, from one point to other points with a minimum of ease and economy. In such systems the use of pallet boards is very desirable in the unloading of such articles from trucks, trains and the like. Usually such articles rest directly on a pallet board when in transit and when the particular truck, train, etc., reaches its destination the articles, which are supported on a plurality of pallet boards, are lifted, together with the pallet boards, by the use of so called "lift" trucks, which lift and translate the articles and pallet boards to a loading zone or receiving station.

At such receiving station difficulties are encountered in moving the articles resting on the pallet boards to positions remote from the receiving station where they need to be sent for further processing and the like.

It is therefore an object of the present invention to provide an improved arrangement for moving a plurality of articles mounted on a pallet board respectively to different predetermined locations.

Another object of the present invention is to provide an improved conveying system wherein a plurality of articles located at a central point may be transferred respectively to different remote positions.

Yet another object of the present invention is to provide improved apparatus for transferring a plurality of stacked articles from a pallet board on which they are mounted to different remote spaced points.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

While it will be apparent to those skilled in the art that the present invention may be used in a great many systems, the particular apparatus is shown and described in connection with transporting cases or packaged products, such as cases of peaches, spinach, and the like, from one central receiving station to a plurality of different points located remotely from the receiving station.

Figures 1, 2:
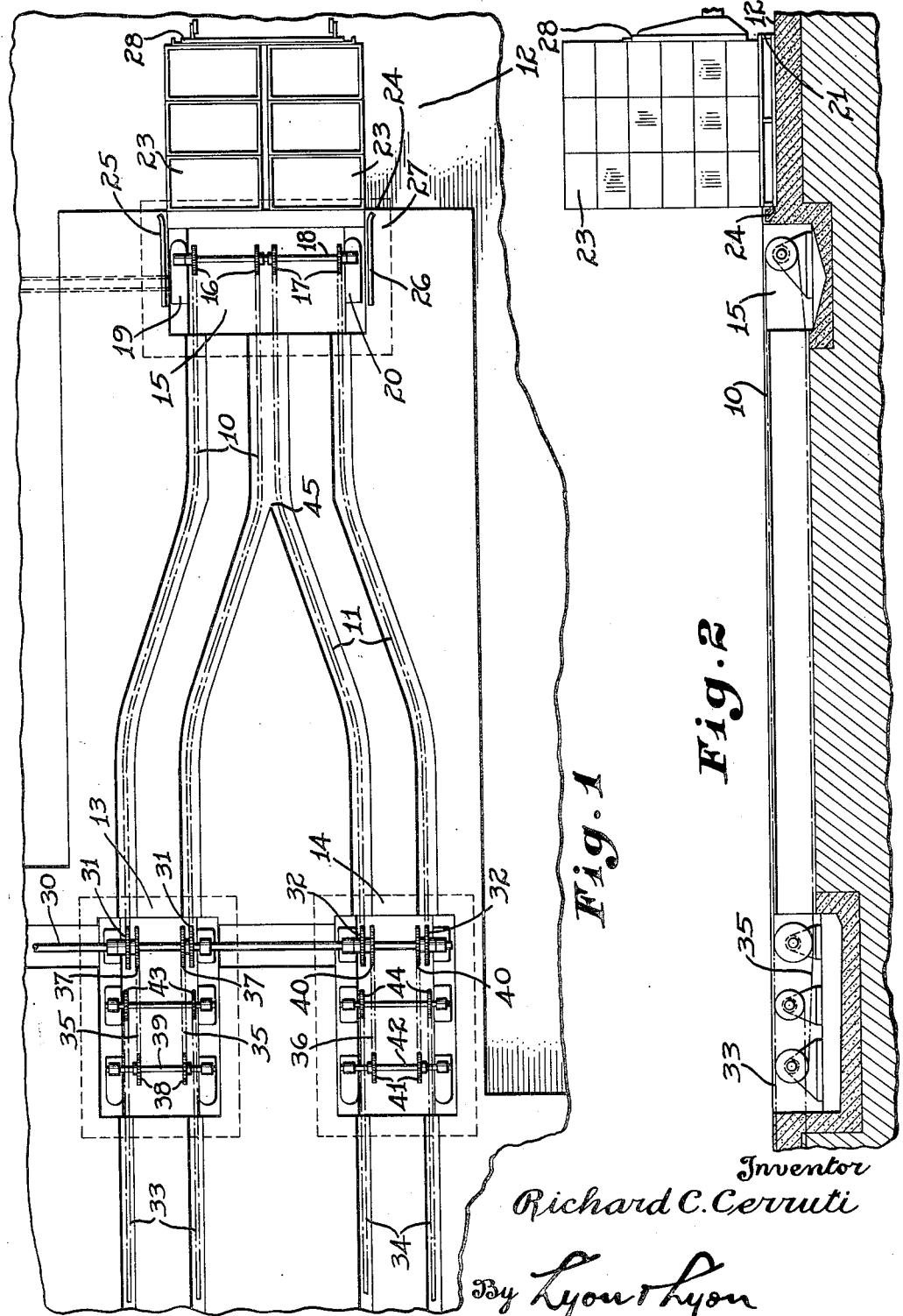
Figure 1 is a plan view of apparatus incorporating the present invention.
Figure 2 is a view, partly in section and partly in side elevation, of the apparatus shown in Figure 1.
Figure 3:
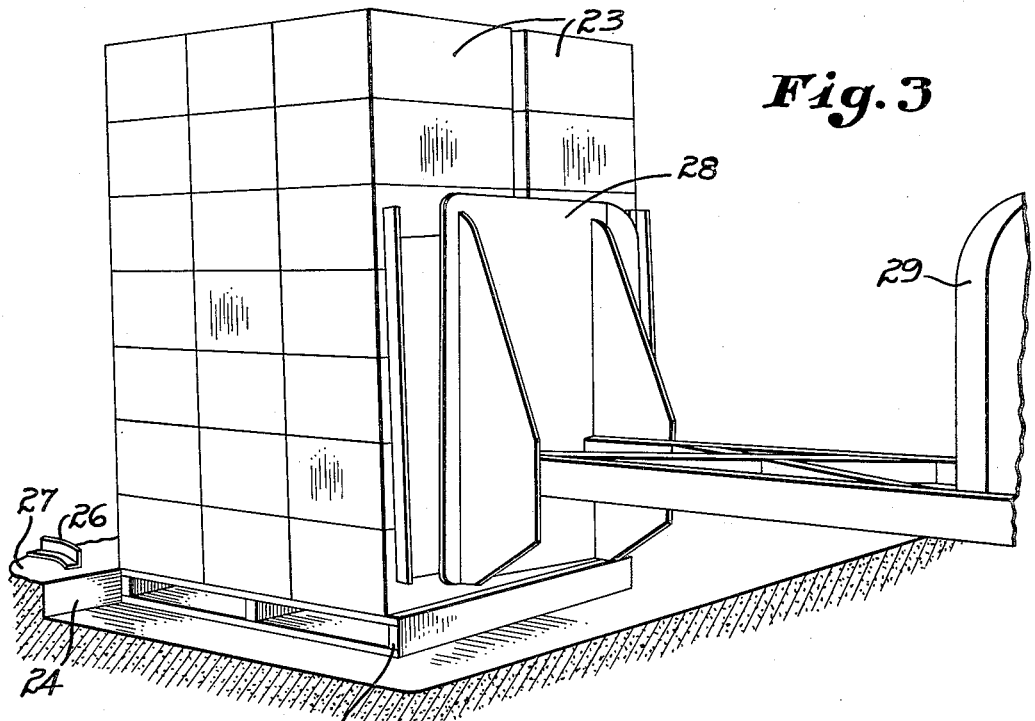
Figure 3 shows in pictorial form some of the apparatus shown in Figure 1.

Referring to Figures 1 and 2, there are provided dual conveyers 10 and 11, each comprising a pair of endless belts, chains or the like, and each of which extends from a central area or pallet board receiving station 12 to different positions 13 and 14, respectively, located remotely from the pallet board receiving station 12. While the conveyers 10 and 11 have been shown as each comprising a pair of elements, it is apparent that the conveyers may comprise a single element or a number of elements greater than the exact amount of two shown herein.

It is noted that the dual conveyers 10 and 11 associated with the pallet board receiving station 12 diverge outwardly from the article or box receiving station 15 adjacent to the pallet board receiving station 12 and that the conveyers 10 and 11 pass over suitable pulleys 16 and 17, respectively, each of which is fastened rigidly on an idler shaft 18 having opposite ends thereof journaled for rotation in the spaced bearing members 19 and 20. It is noted further that the conveyers 10 and 11 form the floor of such box receiving station 15.

It is noted further that as best seen in Figure 2, the conveyers 10 and 11 travel in the same horizontal plane at the location 15 and that the area or pallet board receiving station 12 is at a lower elevation than such horizontal plane defined by the plane of movement of the conveyers 10 and 11, such difference in elevation of the plane of conveyer 10 and the upper surface of pallet board receiving station 12 being substantially equal to or a distance slightly smaller than the thickness of the movable transportable pallet board 21 upon which is stacked the articles or boxes, each having the general reference numeral 23.

It is customary, in packaging food products, to mount cases of such food products in rows on the pallet board 21. In such case each pallet board 21 is loaded with a double row of cases or boxes 23, there being three stacks of boxes each seven high in each row. A pallet board thus loaded with boxes or cases 23 is disposed at the central pallet board receiving station 12 substantially in abutment with the inner vertical wall 24.

The cases 23 thus located in double rows in registry with the space between the box guiding members 25 and 26, fixed on the raised platform member 27, are moved laterally with respect to and from the pallet board 21 by a pusher plate 28, which is moved by a mobile truck 29 incorporating conventional well known means which, per se, form no part of the present invention, or by hydraulic means and the like. The two stacks of boxes 23 are thus moved into the article or box receiving station 15 onto the conveyers 10 and 11, it being noted that the guide members 25 and 26 are arranged symmetrically with respect to the conveyers 10 and 11 and with a space therebetween slightly greater than the combined lengths of the boxes, and that the elements of the conveyers 10 and 11 are so arranged with respect to the guide members 25 and 26 that each of the two separate rows of boxes 23 is caused to travel on different conveyers 10 and 11 from the receiving station 12 to the different points 13 and 14 located remotely with respect to station 12.

The individual rows of boxes 23 are each moved once they are pushed, into the box receiving station 15, on to conveyers 10 and 11, respectively, by power from the power shaft 30, which has the two driving pulleys 31 for driving endless conveyer 10, and the pair of driving pulleys 32 for driving the endless conveyer 11.

As the individual rows of boxes 23 are moved to their respective stations 13 and 14, they are transferred respectively to the conveyers 33 and 34 by means of intermediate conveyers 35 and 36, respectively. For that purpose conveyer 35, comprising a pair of endless belts, chains or the like, passes over the pair of driving pulleys 37 mounted on the driving shaft 30, and a pair of idler pulleys 38 mounted on the idler shaft 39; while the conveyer 36, comprising a pair of endless chains, links, etc., passes over corresponding drive pulleys 40 mounted on the shaft 30, and a pair of idler pulleys 41 mounted on the idler shaft 42.

Endless conveyers 33 and 34 pass respectively over the pair of idler pulleys 43 and 44, the conveyers 33 and 34 being driven by conventional means (not shown).

Figure 4:
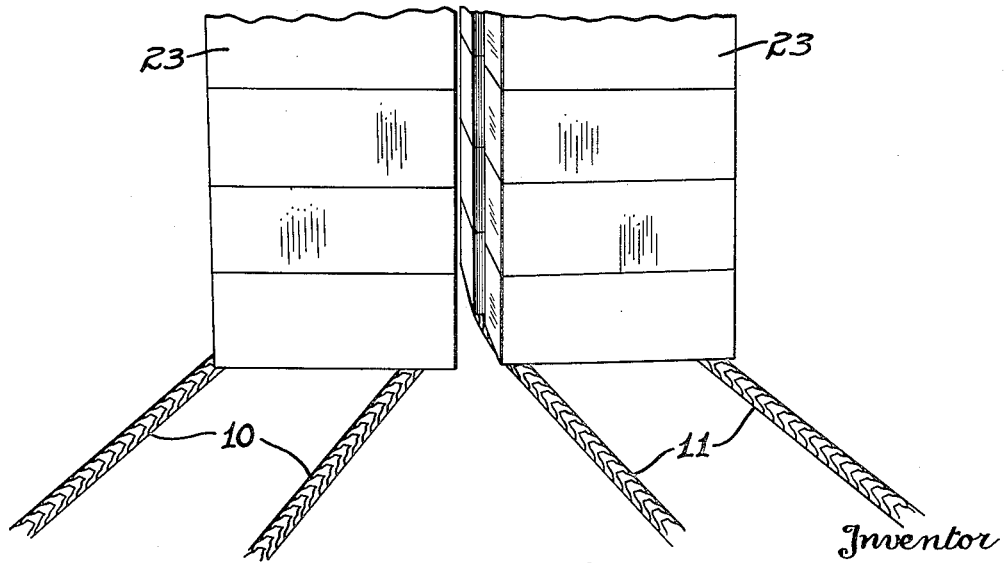
Figure 4 shows in pictorial forms articles in one of their positions when being conveyed by the conveying system shown in Figure 1.

It is thus seen that when the double row of boxes 23 is pushed off the pallet board 21, movement of the pallet board 21 is limited by engagement with the wall 24 and the boxes 23 are moved on different endless conveyers 10 and 11, which effectively causes separation of the two rows at the fork 45 in the manner indicated in Figure 4.

While the particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. In a handling device for delivering boxes to a pair of spaced parallel conveyers, the combination with said spaced parallel conveyers of a pallet board adapted to carry two rows of boxes in close position, a box receiving station, power operated means for moving all boxes as a unit laterally from the pallet board to the box receiving station, dual conveyers associated with the box receiving station forming the floor thereof and diverging outwardly therefrom, said dual conveyers being adapted to separate said rows of boxes, one from the other, as the rows travel on the conveyers, a power shaft for driving said conveyers from their divergent ends, and transfer means driven from said power shaft and adapted to transfer boxes from said dual divergent conveyers to said spaced parallel conveyers.

2. In a conveying system arranged to deliver articles to different spaced positions, means arranged to support said articles in different stacks at a first position in close proximity to one another, a plurality of separate moving conveyers diverging outwardly from said first position respectively to said different spaced positions, and means arranged to move individual stacks of said supported articles simultaneously as a unit onto different ones of said conveyers whereupon said stacks are conveyed and separated one from the other when and as said conveyers with said stacks thereon diverge outwardly.

3. In a conveying system arranged to deliver articles to different spaced positions, an article receiving station, a plurality of separate movable conveyers diverging outwardly from said receiving station at which they travel in substantially the same horizontal plane and forming the floor thereof in said horizontal plane, a pallet board receiving station having a floor adjacent the article receiving station at an elevation lower than said horizontal plane, the distance between said floor and said horizontal plane being such as to accommodate an article support.

4. In a conveying system arranged to deliver articles to different spaced positions, a plurality of separate movable conveyers diverging outwardly from an article receiving station to said spaced positions and being movable in substantially the same horizontal plane at said article receiving station to form a movable floor thereof in said horizontal plane, said article receiving station having a pallet board receiving station including a floor adjacent to said conveyers in a plane lower than the above mentioned horizontal plane, said pallet board receiving station floor being arranged to accommodate a pallet board such that the upper surface of said pallet board is substantially coplanar with the first mentioned horizontal plane and articles in close proximity to one another, means so located with respect to said conveyers that when articles supported on said pallet board in close proximity to one another are moved as a unit therefrom they will travel on different ones of said movable conveyers and separate one from the other.

RICHARD C. CERRUTI.

REFERENCES CITED

The following references are of record in the file of this patent:

UNITED STATES PATENTS

| Number | Name | Date |
|---|---|---|
| 1,193,118 | Buck | Aug. 1, 1916 |
| 1,869,653 | Bauer | Aug. 2, 1932 |
| 2,090,598 | Parsons | Aug. 17, 1937 |
| 2,124,397 | Gwinn et al. | July 19, 1938 |
| 2,265,261 | Bergmann | Dec. 9, 1941 |
| 2,310,160 | Cohen | Feb. 2, 1943 |